US006985983B2

(12) United States Patent
Pellegrino et al.

(10) Patent No.: US 6,985,983 B2
(45) Date of Patent: Jan. 10, 2006

(54) TRANSLATING DEVICE ADAPTER HAVING A COMMON COMMAND SET FOR INTERFACING MULTIPLE TYPES OF REDUNDANT STORAGE DEVICES TO A HOST PROCESSOR

(75) Inventors: Greg Pellegrino, Tomball, TX (US); Choon Seng Tan, Houston, TX (US); Richard D. Gunlock, Houston, TX (US); Matthew Curley, Austin, TX (US); Erick Labraca, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 618 days.

(21) Appl. No.: 09/797,096

(22) Filed: Mar. 1, 2001

(65) Prior Publication Data
US 2004/0225775 A1     Nov. 11, 2004

(51) Int. Cl.
*G06F 13/38* (2006.01)
(52) U.S. Cl. ............. 710/200; 710/315; 710/316; 710/220; 710/37; 710/16
(58) Field of Classification Search ........ 710/305–316, 710/62–64, 8–19, 36–40, 200–240; 711/111–114, 711/147–150, 161–162, 156, 157
See application file for complete search history.

(56) References Cited

U.S. PATENT DOCUMENTS

| | | | | |
|---|---|---|---|---|
| 5,548,712 | A  * | 8/1996  | Larson et al.  | 710/303 |
| 6,151,659 | A  * | 11/2000 | Solomon et al. | 711/114 |
| 6,154,789 | A  * | 11/2000 | Grieff et al.  | 710/14  |
| 6,182,182 | B1 * | 1/2001  | Bradley et al. | 710/306 |
| 6,549,981 | B2 * | 4/2003  | McDonald et al.| 711/114 |
| 6,606,651 | B1 * | 8/2003  | Linde          | 709/216 |
| 6,633,962 | B1 * | 10/2003 | Burton et al.  | 711/163 |
| 6,675,258 | B1 * | 1/2004  | Bramhall et al.| 711/114 |
| 6,681,310 | B1 * | 1/2004  | Kusters et al. | 711/202 |
| 6,684,274 | B1 * | 1/2004  | Chong, Jr.     | 710/56  |
| 6,721,317 | B2 * | 4/2004  | Chong, Jr.     | 370/389 |

* cited by examiner

*Primary Examiner*—Paul R. Myers
*Assistant Examiner*—Raymond N Phan

(57) ABSTRACT

A translating host bus interface adapter is capable of connecting a computer system as a compute node to a storage area network. The adapter has a processor and a memory system containing firmware for execution in the processor. The host bus adapter is capable of recognizing first and second types of redundant storage accessible over the storage area network and translating generic storage commands into translated commands suitable for communicating with either type of redundant storage, and forwarding the translated commands onto the storage area network. The translating host bus adapter is also capable of constructing and maintaining a mirrored dataset comprising copies on redundant storage systems of either or both types.

17 Claims, 4 Drawing Sheets

`US 6,985,983 B2`

TRANSLATING DEVICE ADAPTER HAVING A COMMON COMMAND SET FOR INTERFACING MULTIPLE TYPES OF REDUNDANT STORAGE DEVICES TO A HOST PROCESSOR

RELATED APPLICATIONS

The material of this application relates to the material of copending U.S. patent application Ser. No. 09/643,633, entitled "Raid System Having Multiple Reply Queues For Use With Multiprocessor Host", the disclosure of which is incorporated herein by reference.

FIELD OF THE INVENTION

The invention pertains to the field of intelligent device adapters for coupling storage devices to computer systems. In particular, the invention relates to a device adapter having a processor and embedded firmware for translating commands of a common protocol command set into commands suitable for multiple types of storage devices.

BACKGROUND OF THE INVENTION

There are many different types of storage devices for computer systems on the market; each type having at least some differences in the way it interfaces to a computer system. Often, a single company markets more than one type of mutually incompatible storage device. For example, consider Redundant Array of Independent Disk (RAID) storage devices, as known to be available from many vendors including EMC and Compaq. RAID storage devices are known that may operate in any of several modes, including mapping of single or concatenated disks and disk sets to logical volumes without redundancy. Other modes may include mapping datasets to disk sets while maintaining data parity across multiple disks such that data is redundant and can be rebuilt if any one drive fails (RAID-4 and RAID-5 modes). RAID storage devices may have multiple controllers where each controller can access a set of common disk drives. RAID and other storage devices may also be operated in local or remote mirror-set modes, where duplicate copies of data are maintained in separate sets of disk drives.

Dual-controller RAID systems are known, including some Compaq Raid Array 8000 systems, wherein there may be two controllers sharing access to an array of disk drives. Systems of this type are available that operate in a active/standby redundant mode, where one controller provides access to all logical units of storage provided by the system. In active/standby mode, failure of the active controller causes failover to the standby controller, which then provides access to the logical units. Systems of this type are also known that operate in an active/active mode, where both controllers are normally active. In active/active mode, each controller normally provides access to a subset of the logical units of storage provided by the system, and failure of either controller causes failover of those units it was serving to the remaining controller.

In dual-controller RAID systems of either type, each controller typically has its own set of SAN addresses. It is therefore necessary for each storage node accessing the dual-controller system to automatically change the SAN addresses used for accessing at least some LUNs of the RAID system from controller to controller as failovers occur. Further changes to SAN addresses for particular LUNs may also be required as controllers are repaired, or system throughput optimized as loads are balanced between dual active controllers.

Failover (a taking-over by standby hardware of storage-serving activity, typically necessitated by failure of active hardware) often can be induced either by failures detected by a controller of the dual controllers, or by failures detected by a compute node. When a compute node detects failure of, or inability to communicate with, a particular controller, it may issue commands instructing the other controller of the same dual-controller system to take over the storage-serving activity formerly handled by the failed controller. It is known that these failover commands may differ between controllers of different types, even if those controllers are made by the same manufacturers.

Existing RAID and other redundant storage devices typically require control functions and control sequences for controlling their redundant features in addition to typical read and write control functions. Further, multiple-controller RAID devices are known that can transfer responsibility for particular datasets from one controller to another upon failure of a controller or otherwise. These redundancy control functions may include, in addition to other functions:

a. monitoring of one or many connections between a computer and storage controller, such that data is sent over properly operating interconnect,
b. monitoring of controller access to particular datasets,
c. monitoring of controller activity and health, such that data is communicated between computer and functioning controllers that have access to the data desired;
d. determining when to split, and when to re-synchronize, mirrored data,
e. performance of dataset reconstruction and re-synchronization as needed,
f. coordinating redundancy control functions with any other computers having access to the data to avoid conflicts that can cause data loss, such as performing incompatible updates to different copies of split mirrored datasets,
g. controlling failover of individual LUNS among controllers, and/or entire redundant controllers, to provide continued access to datasets, and
h. balancing loads among active/active redundant controllers.

RAID and other storage devices typically connect to computers through a form of interconnect and a host adapter of each computer. The interconnect often complies, and operates according to, a standard for cabling and protocol such as a version of the SCSI (Small Computer Systems Interface) standard or the Fibre Channel standards.

Multiple computer systems may connect to multiple storage systems through a Storage-Area Network (SAN). A storage area network (SAN) is a dedicated, centrally managed, information infrastructure, which enables interconnection of compute nodes and storage nodes. A storage area network facilitates universal access and sharing of storage resources. SANs are often implemented with Fibre Channel technology as known in the art. Typically, a SAN utilizes block-oriented protocols, such as a SCSI-like protocols encapsulated within Fibre Channel frames, for providing storage to compute nodes. This differs from general purpose networks (GPNs), including local area networks (LANs), wide area networks (WANs) and the Internet, which typically implement file-oriented protocols. Some storage area networks may encapsulate block oriented protocols in other protocols, a protocol of this type is iSCSI.

Connection of RAID and other storage devices to a computer system through a SAN further complicates control of redundancy features because it is often possible to find more than one path through a SAN from the computer to one or more of the storage devices. When more than one such path exists, it is necessary to control the path over which data is communicated, and it may become possible or desirable to distribute communications among the multiple paths.

HISTORICAL SOLUTION

In the past, a separate operating system (OS) driver has been required for each operating system, interface adapter and device protocol combination. Each OS driver is installable into the operating system it is designed for, and generates control sequences according to, the device protocol for each device supported. These control sequences are then passed from the OS driver through the interface adapter, over any relevant cabling, to the device. Data and command response information is returned from the device through the interface adapter to the OS driver.

This traditional approach relies upon the OS drivers to control redundancy functions of the storage devices as well as typical data read and write functions. These redundancy functions include determination of when mirrored sets are to be broken, rebuilt, or synchronized, as well as when and how operation may continue when a single drive of a RAID set fails.

With this traditional approach, given five operating systems, which by way of example but not of limitation may include the Linux, Compaq Tru-64 Unix, Novell Netware, Microsoft Windows NT, and Microsoft Windows 98 systems, and two types of RAID controllers such as the Compaq RAID Array 4100 (RA4100) and Compaq RAID Array 8000 (RA8000, formerly DEC HSG80), ten OS drivers are required. This approach can cause difficulty if multiple, mutually incompatible, devices are attached through the same interface adapter because multiple OS drivers do not always share a single adapter gracefully. It is also known that a single SCSI-II interconnect may interface up to 16 devices, one or more of which may be computer host adapters, and a Fibre Channel adapter could interface to a network fabric having thousands of devices.

In order to overcome the problems posed by multiple OS drivers attaching through a common adapter, fewer but more complex installable OS drivers may be used. With this approach, one complex OS driver is prepared per operating system. These alternate OS drivers must have the ability to interface OS-specific system-call commands to device-specific commands for each of the device types that may connect to each adapter. These OS drivers can become quite complex, and typically contain the following modules:
a. an OS-interface module, for communicating with the operating system,
b. two or more command interpreting and translation modules, one dedicated to each type of device, each module in communication with the OS-interface module,
c. a redundancy control module operating in tandem with each command interpreting and translation module for controlling redundant features of each type of device,
d. an adapter-interface module in communication with the adapter and with the command interpreting and translation modules, and
e. a redundancy control module operating in conjunction with the adapter-interface module to control any path redundancy that may exist.

It is known that the command interpreting and translation modules of the OS driver may themselves be installable modules. Since installable module mechanisms often differ greatly between operating system environments, considerable work is often required if OS drivers for multiple operating systems are to embody installable modules.

In effect, the intelligence required for translating from the operating system's command set to multiple device-specific command sets has typically been located in the installable OS driver, which may become quite complex.

Most storage devices, including RAID controllers, on the market today contain a processor executing code known as firmware. Many of these devices embed their firmware in reprogrammable memory such as EEPROM such that it is possible to update firmware. Some of these devices provide ways of programming the EEPROM in the field with updated firmware downloaded to them from a compute node of a SAN.

Many host adapters available today perform more functions than that of passing data and commands between a host processor or compute node and a storage device or storage node. Among the first advanced features incorporated in host adapters was the use of Direct Memory Access (DMA) to allow the adapter to fetch or store data directly into memory of the compute node. Similar to DMA is Bus Mastering, wherein a host adapter can perform DMA access directly, without need of processor intervention to set up a separate DMA controller for each transfer. It is known that some Bus Mastering host adapters have some intelligence, including a processor and memory, sufficient to permit them to follow linked lists of commands located in compute node memory and to perform disk-caching functions.

SUMMARY OF THE INVENTION

The foregoing and other features, utilities and advantages of the invention will be apparent from the following more particular description of a preferred embodiment of the invention as illustrated in the accompanying drawings.

An intelligent device adapter has been developed. This adapter is installable into a computer system and incorporates a processor and memory, including firmware, as well as interface hardware components. The adapter uses a common protocol (herein referenced as the Redundancy Application Programming Interface, or RAPI) to communicate with a relatively simple, common, OS driver. The adapter firmware contains multiple command interpreting and translation modules and redundancy control modules for communication with multiple device types over multiple pathways.

The intelligent adapter is also capable of managing failover of multiple types of dual-controller RAID systems.

In effect, the intelligence required for translating to the multiple, device-specific, command sets has been moved from the installable OS driver into the intelligent device adapter. This permits use of an OS driver that is much simpler than those of the prior art; since only one command interpreting and translation module need be present in the driver. The task of providing OS drivers for each of several operating systems is therefore made easier than with a prior art adapter.

DETAILED DESCRIPTION

Figure 1:
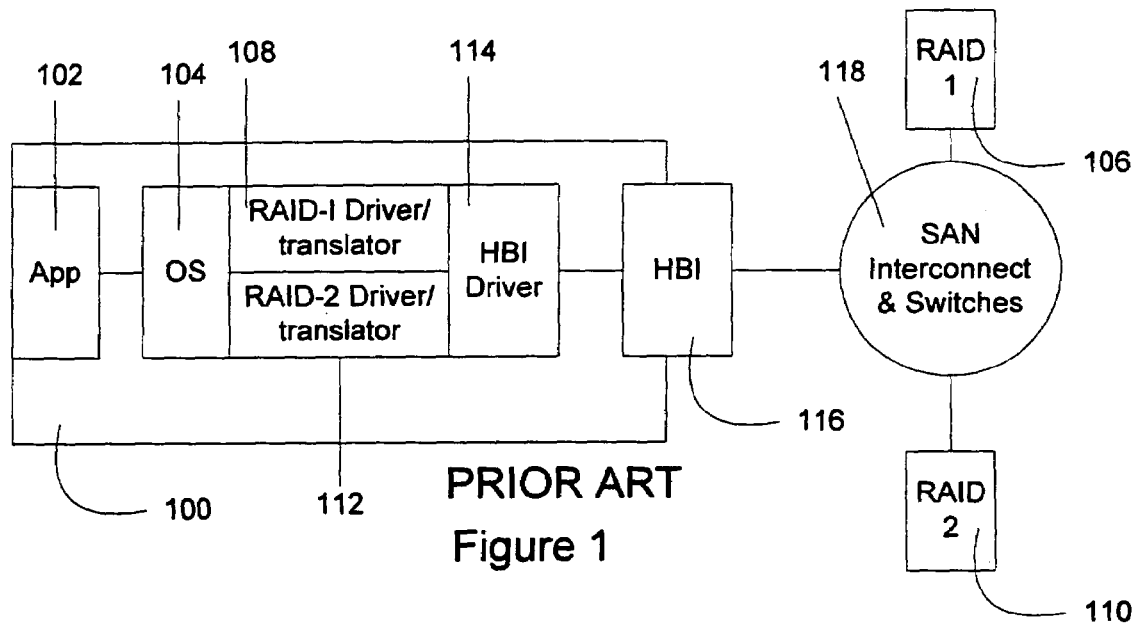
FIG. 1 is a block diagram of a computing system incorporating typical prior-art, multiple-device, installable OS drivers with a prior-art intelligent adapter.

A computing system having multiple types of redundant storage devices as known in the art has one or more computing nodes 100 (FIG. 1). Running on the computing node 100 is one or more application programs 102 that communicate with an operating system 104. The operating system passes storage requests directed to a first storage device 106 (here a type-1 RAID controller) to a suitable installable driver/translator module 108, and requests directed to a second storage device 110 (here a type-2 RAID controller) to a second installable driver/translator module 112. The driver/translator modules communicate through a host-bus-adapter driver 114 to a host-bus-adapter 116. The host-bus-adapter 116 couples the host-bus-adapter driver 114, executing on a processor of the computing node, to a storage area network (SAN) interconnect 118 that is coupled to the first 106 and second 110 RAID controllers.

Figure 2:
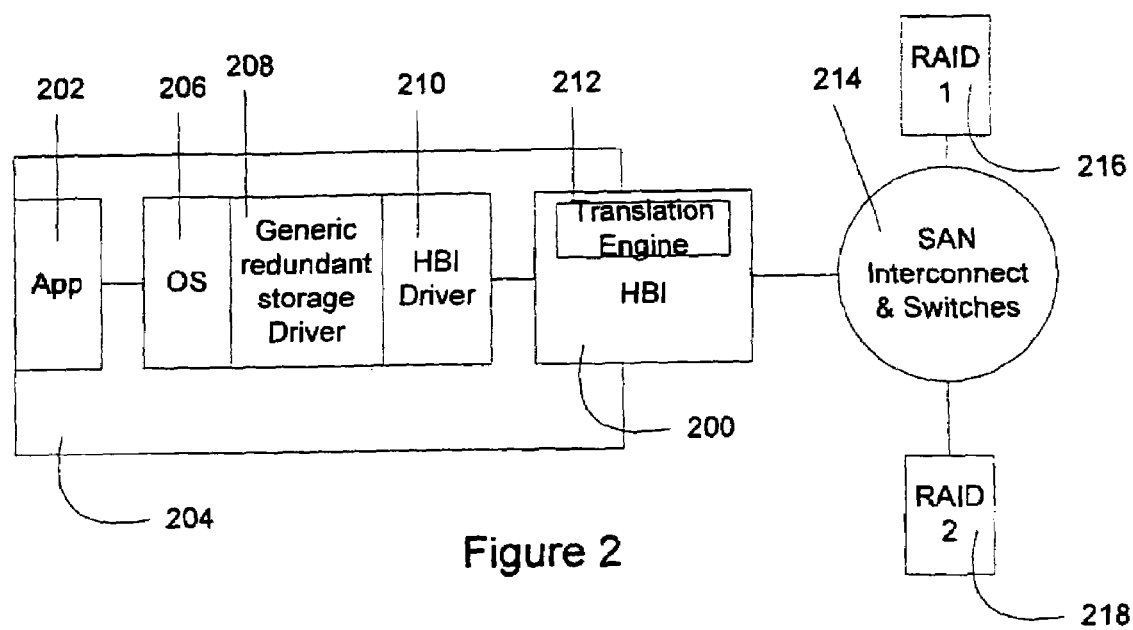
FIG. 2, a block diagram of a computing system incorporating an interface adapter according to the present invention.

A computing system having a translating intelligent host-bus adapter 200 (FIG. 2) according to the present invention also has an application program 202 executing in a compute node 204. The application program communicates with an operating system 206, which passes storage requests to a generic redundant storage driver 208. The generic redundant storage driver 208 communicates through a host-bus-interface driver 210 (which may be combined with redundant storage driver 208) to translating intelligent host-bus-interface adapter 200. The host-bus-interface adapter 200 incorporates a translation engine 212, comprising translation firmware executing on a host-bus-interface processor, for translating generic redundant storage functions into specific functions of several types of storage devices, including type-1 and type-2 RAID controllers. Host-bus-interface adapter 200 communicates through SAN interconnect 214 to type-1 216 and type-2 218 RAID controllers.

The intelligent host-bus-interface adapter 200 comprises a host-bus-interface (HBI) processor 300 and a memory system 302, together with a PCI interface bridge 304 for communicating over a PCI bus 306 with a peripheral interface bus of a compute node host. HBI processor 300 also has an interrupt output 308 for alerting a processor of the compute node host as necessary. The adapter also has a SAN interface 310 for communicating over a storage-area-network connection 312 with redundant storage systems. Within memory system 302, which comprises a combination of volatile and nonvolatile memory devices, is firmware 314 for controlling execution of HBI processor 300, including translation firmware 316 for translating generic redundant storage calls into specific functions of each supported type of storage device. Memory system 302 also has sections allocated for caching drive data 320, containing a storage command queue 322, and for controlling one or more reply queues 324 as known in the art of computing systems and as disclosed in a related patent application Ser. No. 09/643,633, entitled "Raid System Having Multiple Reply Queues For Use With Multiprocessor Host", the disclosure of which is hereby incorporated by reference. While the invention is usable to attach a multiprocessor host as a compute node to a SAN, it may also be used with a single processor host.

In a first embodiment of the invention, the intelligent host-bus-interface adapter also has a drive interface 330 for interfacing to locally-controlled storage devices over a drive bus 332. This permits the adapter to perform double-duty as a RAID controller or a mirrored dataset controller.

Figure 3:
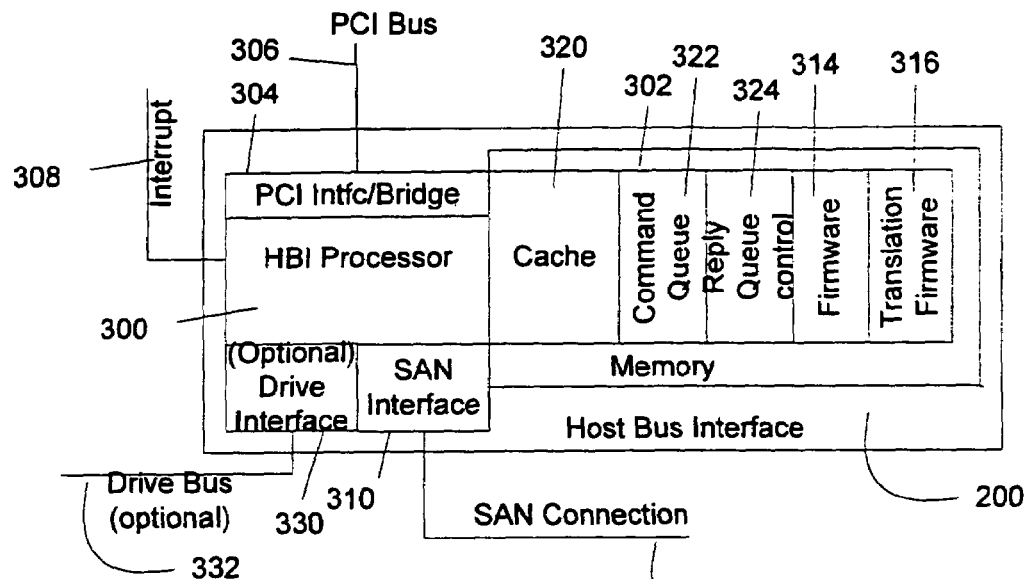
FIG. 3, a block diagram of an interface adapter according to the present invention.
Figure 4:
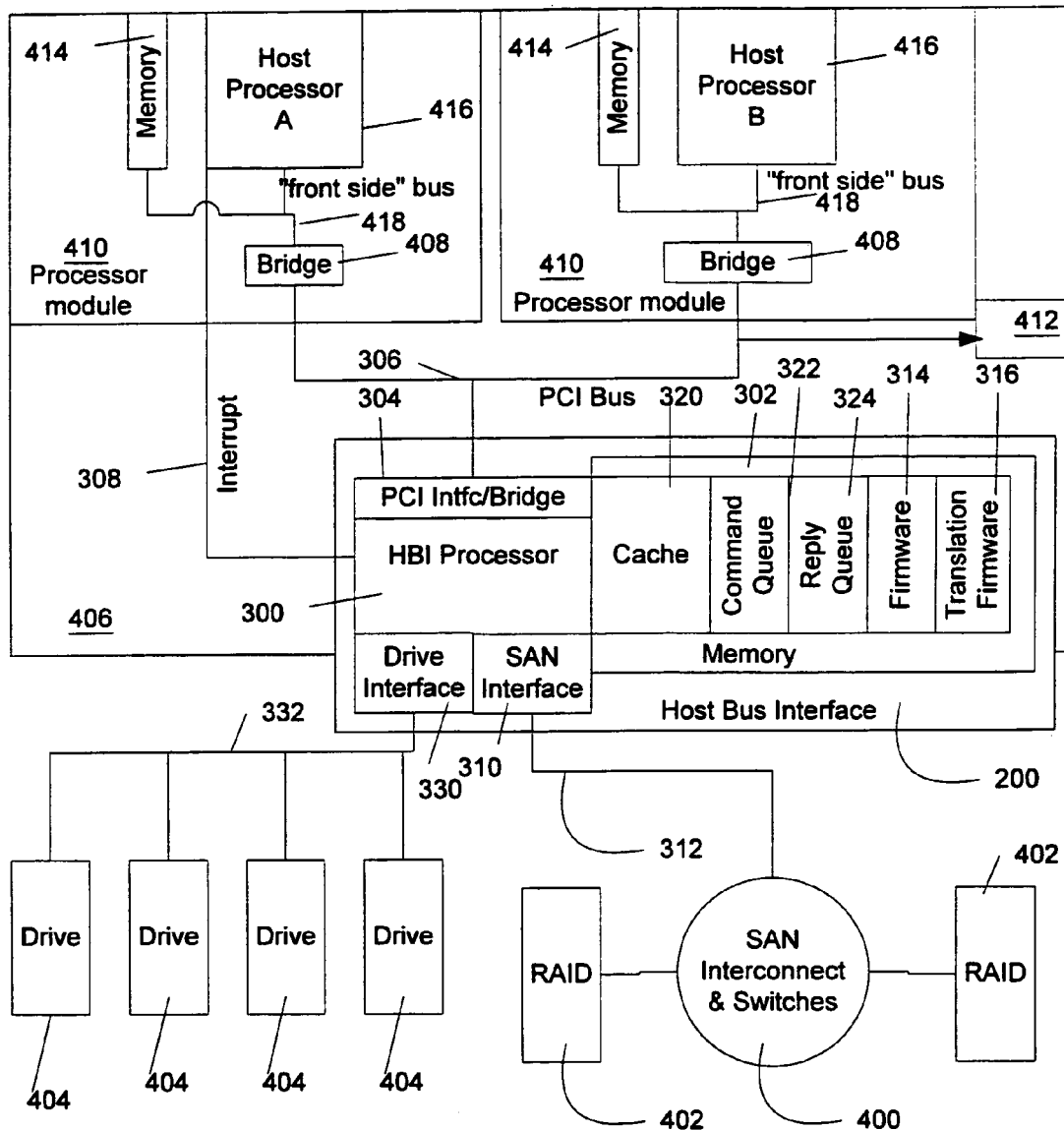
FIG. 4, a block diagram of a system incorporating an interface adapter according to the present invention.
Figure 5:
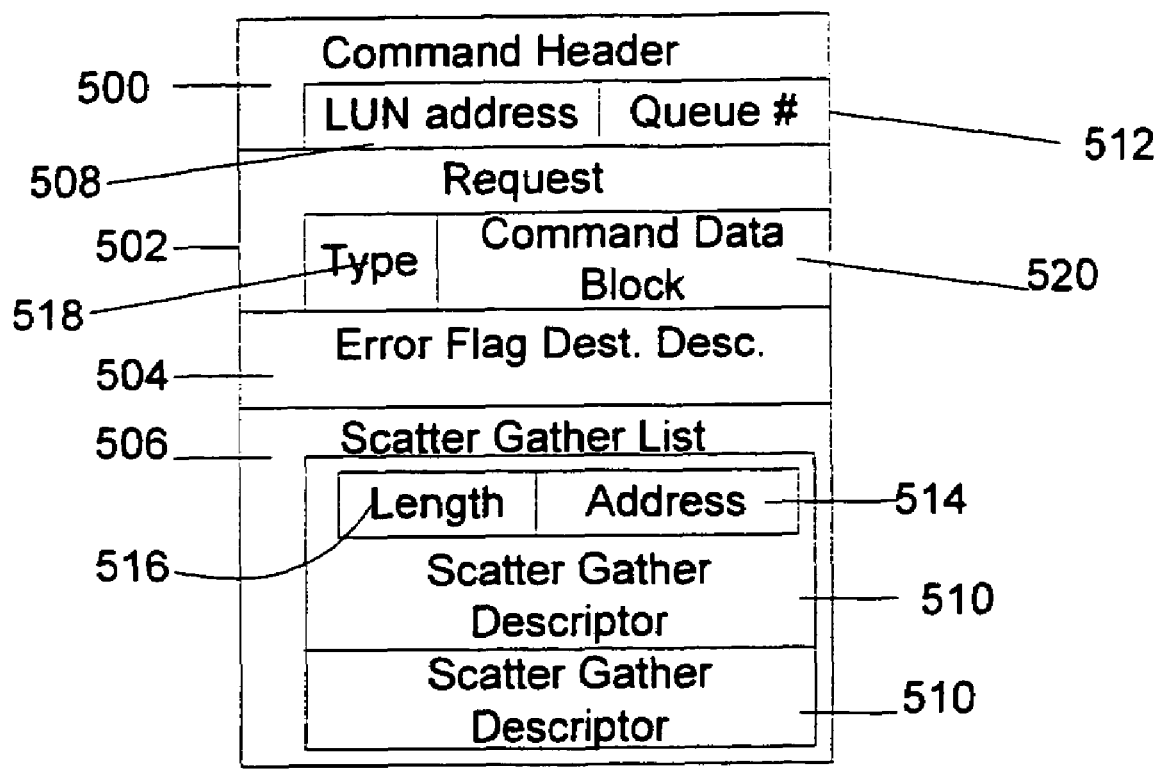
FIG. 5, command formats utilized with the Redundant storage Application Programming Interface.

A multiple-processor computing system embodying the present invention has a host bus adapter 200, as described with reference to FIG. 3, having its SAN interface 310 coupled over SAN interconnect 312, through additional SAN interconnect 400 (FIG. 4), comprising fibre-channel SAN interconnect system as known in the art, to one or more redundant storage systems 402. Redundant storage systems 402 may be of the same or of different types. While the host bus adapter of the present invention has the ability to connect to multiple storage systems of different types, it is capable of operating even if all the storage systems are of the same type.

Drive bus 332 may also be coupled to one or more storage devices, such as disk drives 404. Host bus adapter 200 is coupled into a PCI bus of single or multiple-processor compute node 406, thereby connecting the PCI bus 306 of the host bus adapter to a front-side-bus-to-PCI bridge 408 of each of one or more processor modules 410 of the compute node 406. The PCI bus 306 may also couple to additional peripheral interfaces, processor modules, or memory subsystems 412. Each processor module contains a memory system 414, which may contain cache memory, and a processor 416, which may also contain cache memory. Each processor 416 typically communicates with its memory 414 over a front-side-bus 418. Processors 416 may be Intel Pentium II, III, or IV, Intel Itanium, Compaq Alpha, or other processors as known in the art or hereafter developed.

With reference once again to FIG. 2, generic redundant storage driver 208 communicates with the translating HBI 200 using commands constituting a Redundant storage Application Programming Interface (RAPI). Each command contains a header 500, a command request 502, an error flag destination descriptor 504, and a scatter gather list 506. The command header includes an address 508, in logical unit number form, of storage system or device, such as a particular disk drive selected from disk drives 404 or a partition resident on one or more redundant storage systems 402.

The command header also incorporates a count (not shown) of zero or more scatter-gather descriptors 510 present in the scatter gather list 506, and an identification of the reply queue 512 to which any result is to be posted; as per related application Ser. No. 09/643,633.

It is intended that a logical unit presented to the host operating system by the intelligent adapter 200 may be single logical unit resident on a redundant storage system 402. A logical unit presented to the host operating system may also be a concatenation of logical units resident on one or more redundant storage systems 402, or a mirrored dataset having a copies on separate storage systems of the redundant storage systems.

Each scatter gather descriptor 510 of the scatter-gather list 506 contains an address 514 and a length 516 of data to be transferred to storage, or of a location in memory to receive data transferred from storage.

The request 502 contains a command type 518 and a command data block 520 that provides instructions regarding what is to be done by the intelligent adapter 200 and the attached drives 404 and storage systems 402. The RAPI will accept typical storage device identification read, and data read and write commands, as well as commands suited for controlling redundant storage, including:

Get Device State Information

This command returns information about a logical unit, including the redundancy mode of the device, path status, path identifiers, logical device status, and whether mirrored datasets are coherent or a RAID set incorporates a failed drive.

Set Path to Device Active

This command instructs the host bus adapter to associate a particular path with communications intended for a particular logical unit.

Get Volume

Returns configuration information for a logical unit, which may be a concatenated logical unit. Configuration information for a concatenated logical unit includes a count and logical unit identification of units making up or mirroring the overall concatenated logical unit.

Set Volume

This command configures a logical unit as a combination of smaller logical units Clear path degraded state Return all paths to a designated logical unit to normal operation, even if one or more paths have been marked inoperative or degraded due to operational errors monitored by the host bus adapter.

Get Device Unique Identifier

This command returns a buffer with the components to match a given Path Identifier with a Unique Identifier for a given logical device.

Get Logical Device Information

This command takes the given logical device address and returns an associated storage chassis information that the device is part of. It also returns addresses of all physical devices associated with the storage chassis.

Get Physical Device Information

This command takes the given physical device address and returns a list of other physical devices and logical devices associated with the storage chassis this device is part of.

Get Bus Information

This command returns an array of data structure which contain the detail information about the bus number specified in the CDB (Command Descriptor Block).

The HBA maintains a list of accessible logical units in the SAN. This list contains partitions, RAID sets, concatenated disks and partitions, and raw disks that may be available for use. This list is updated periodically as storage nodes become accessible to, or drop off of, the SAN and as storage nodes are reconfigured.

The intelligent host bus interface adapter is capable of translating generic communications from the host compute node into communications with datasets provided by redundant storage controllers of a first and a second type. It is also capable of combining datasets provided by multiple storage controllers, whether or not of the same type, into composite datasets of concatenated or mirrored-redundant form. The HBA then utilizes generic communications with the host compute node and controller-specific communications with the multiple storage controllers to perform read and write access to the composite dataset.

The intelligent adapter is also capable of managing failover of multiple types of dual-controller RAID systems. For example, the intelligent adapter can instruct a first controller of a Compaq RA4100 or RA8000 dual-controller system to take over control of one or all logical units served by a second controller of that system. When this happens, the adapter is capable of rerouting SAN traffic from the compute node to those logical units to the second controller.

As an example of controller-type-specific commands issued by the HBA, consider the RA8000 and RA4000 series RAID controllers. With the RA8000 (HSG80) fail over is accomplished in active/active mode by issuing a SCSI "Start Unit" command to the non-owning controllers representation of the LUNs to be transferred. This command may have different results in other systems. In the RA4000 (Active-Standby model) fail over is accomplished by issuing a vendor unique SCSI-over-Fibre-Channel command to tell the inactive controller to become active, and tell the active controller to become standby. It is expected that future RAID controllers may utilize failover control sequences different from either of these sequences; firmware of the HBA is embodied in electrically alterable memory to permit it to be updated as necessary to support these future RAID controllers without requiring its removal from a host computer system.

A computer program product is any machine-readable media, such as an EPROM, ROM, RAM, DRAM, disk memory, or tape, having recorded on it computer readable code that, when read by and executed on a computer, instructs that computer to perform a particular function or sequence of functions. A computer having the code loaded on it includes a computer program product because it incorporates DRAM and/or disk memory having the code recorded in it. It is anticipated that the debugger of the present invention will be distributed as a program product. Similarly, a host bus adapter having particular firmware loaded upon it is also a computer program product because it incorporates memory having the firmware recorded in it.

While the invention has been particularly shown and described with reference to a preferred embodiment thereof, it will be understood by those skilled in the art that various other changes in the form and details may be made without departing from the spirit and scope of the invention.

We claim:

1. A translating host bus interface adapter comprising:
an interface to a peripheral interconnect bus capable of interfacing the adapter to a computing system;
a host bus adapter processor and a host bus adapter memory system;
an interface to a storage area network;
firmware for execution in the host bus adapter processor, the firmware recorded in the host bus adapter memory system;
and wherein the host bus adapter is capable of recognizing a first type and a second type of redundant storage controller accessible over the interface to a storage area network, of receiving generic commands over the interface to a peripheral interconnect bus, translating these commands into translated commands suitable for communicating with a redundant storage controller of the first type or the second type of redundant storage controller, and forwarding the translated commands onto the storage area network.

2. The host bus adapter of claim 1, wherein the host bus adapter is capable of concatenating a logical volume provided by a redundant storage controller of the first type with a logical volume provided by a redundant storage controller of the second type into a concatenated volume, and presenting the concatenated volume to the computing system.

3. The host bus adapter of claim 1, wherein the host bus adapter is capable of constructing and maintaining a mirrored dataset from a plurality of redundant storage controllers accessible over a storage area network, wherein the mirrored dataset comprises a first copy on at least a first redundant storage controller of the plurality of redundant storage controllers and a second copy on at least a second redundant storage controller of the plurality of redundant storage controllers.

4. The host bus adapter of claim 3, wherein the host bus adapter is also capable of interfacing directly to at least one storage device.

5. The host bus adapter of claim 3, wherein the first redundant storage controller and the second redundant storage controller are permitted to be of differing types.

6. The host bus adapter of claim 5, wherein the firmware is contained in electrically alterable memory of the memory system such that the firmware may be updated without removing the host bus adapter from the computing system.

7. The host bus adapter of claim 5, wherein the host bus adapter is capable of supporting multiple reply queues for use with a multiple processor computing system.

8. A method, comprising:
  receiving, in a host bus adapter, a command from a host computer;
  translating, in the host bus adapter, the command from a generic format in which the command was received into a first format adapted to be received by a first storage controller connected to the host bus adapter;
  forwarding the translated command to the first storage controller;
  translating in the host bus adapter, the command from a generic format in which the command was received into a second format adapted to be received by a second storage controller connected to the host bus adapter; and
  forwarding the translated command to the second storage controller.

9. The method of claim 8, wherein receiving, in a host bus adapter, a command from a host computer comprises receiving a command header that comprises:
  an address of a logical of a storage system or device; and
  a reply queue identifier that designates a reply queue to which replies to the command are to be posted.

10. The method of claim 8, further comprising maintaining, in the host bus adapter a list of accessible logical units in a storage area network connected to the host bus adapter.

11. The method of claim 8, further comprising:
  receiving, at the host bus adapter, a plurality of datasets from one or more storage controllers in response to a command from a host computer; and
  combining, at the host bus adapter, the plurality of datasets into a combined dataset.

12. The method of claim 8, further comprising:
  detecting a failure condition associated with a first storage controller connected to the host bus adapter; and
  re-routing one or more commands addressed to the first storage controller to the second storage controller connected to the host bus adapter.

13. A host bus adapter, comprising:
  an interface to a host computer system;
  a processor and a memory system;
  an interface to a storage area network; and
  logic instructions stored in the memory system which, when executed by the processor, configure the processor to;
  recognize a first type and a second type of redundant storage controller accessible over the interface to a storage area network;
  receive a generic command from the host computer system;
  translate the generic command into translated commands suitable for communicating with a redundant storage controller of the first type or the second type of redundant storage controller; and
  forward the translated commands onto the storage area network.

14. The host bus adapter of claim 13, further comprising logic instructions which, when executed by the processor, configure the processor to concatenate a logical volume provided by a redundant storage controller of the first type with a logical volume provided by a redundant storage controller of the second type into a concatenated volume, and present the concatenated volume to the host computer system.

15. The host bus adapter of claim 13, further comprising logic instructions which, when executed by the processor, configure the processor to construct and maintain a mirrored dataset from a plurality of redundant storage controllers accessible over a storage area network, wherein the mirrored dataset comprises a first copy on at least a first redundant storage controller of the plurality of redundant storage controllers and a second copy on at least a second redundant storage controller of the plurality of redundant storage controllers.

16. The host bus adapter of claim 13, wherein the logic instruction are embodied in firmware contained in electrically alterable memory of the memory system such that the firmware may be updated without removing the host bus adapter from the computing system.

17. The host bus adapter of claim 13, further comprising logic instructions which, when executed by the processor, enable the processor to support multiple reply queues for use with a multiple processor computing system.

* * * * *